United States Patent [19]

Brucker

[11] 4,316,325
[45] Feb. 23, 1982

[54] WEED CUTTING APPARATUS

[76] Inventor: William S. Brucker, 1500 Providence Rd., Towson, Md. 21204

[21] Appl. No.: 731,746

[22] Filed: Oct. 12, 1976

[51] Int. Cl.³ .............................................. A01D 55/18
[52] U.S. Cl. ........................................ 30/276; 56/12.7
[58] Field of Search .................. 30/276, 347; 56/12.7, 56/295

[56] References Cited

U.S. PATENT DOCUMENTS

| | | | |
|---|---|---|---|
| 3,826,068 | 7/1974 | Ballas | 56/295 X |
| 3,859,776 | 1/1975 | Ballas et al. | 56/295 X |
| 3,895,440 | 7/1975 | Pittinger | 30/347 |

Primary Examiner—Jimmy C. Peters
Attorney, Agent, or Firm—Squire, Sanders & Dempsey

[57] ABSTRACT

A device for storing and automatically metering monofilament line for a filament weed cutter comprising a spool having a hub and opposing flanges for holding a supply coil of the filament; and a support member having a top flange, a core for receiving the spool, and retaining members disposed radially outwardly from the spool flanges for retaining the filament on the spool and for metering by fatiguing engaged segments of the line. A clearance is provided between the retaining members and the spool to make the filament on the spool manually accessible.

1 Claim, 3 Drawing Figures

U.S. Patent     Feb. 23, 1982     4,316,325
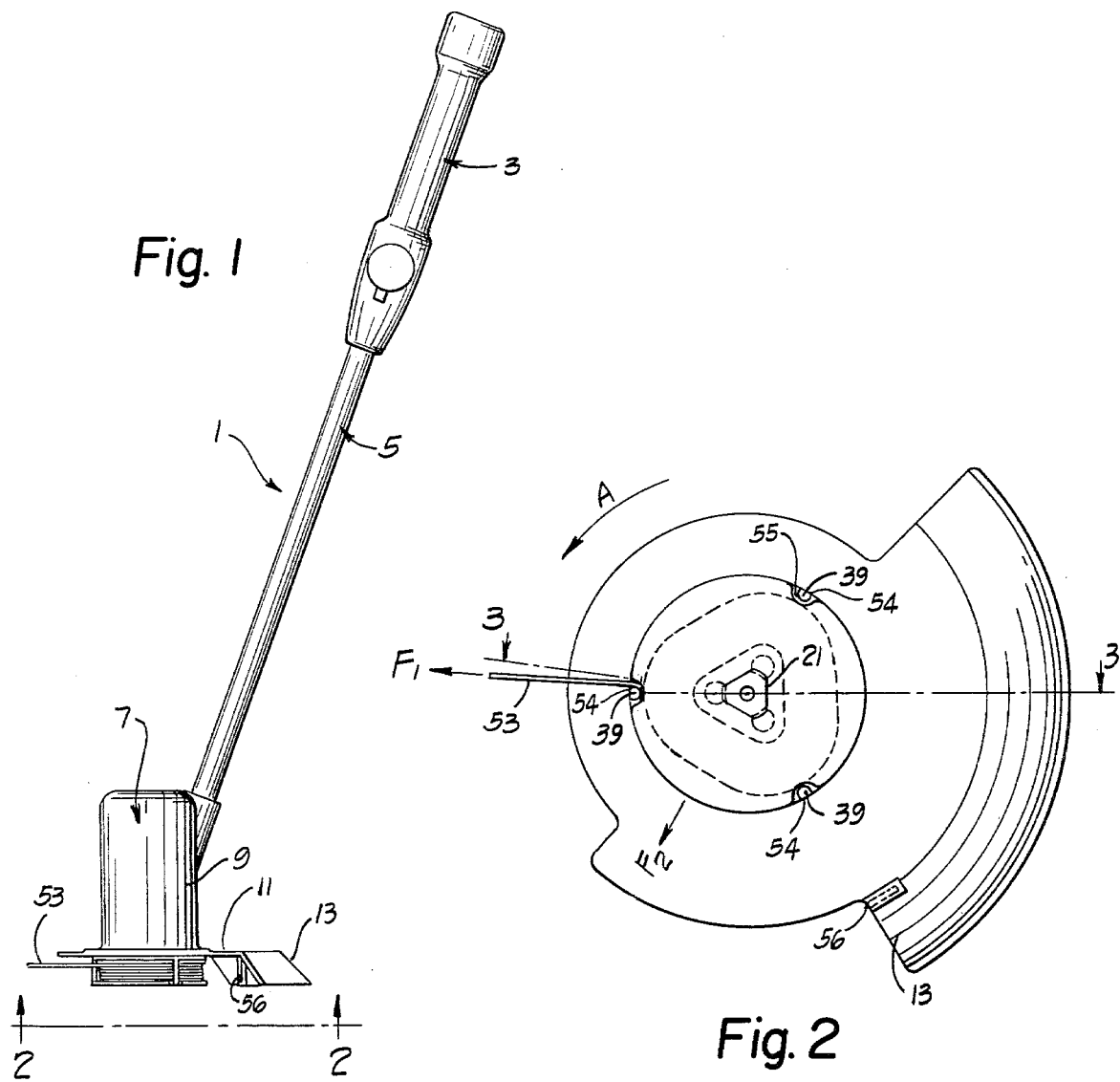
Fig. 1
Fig. 2
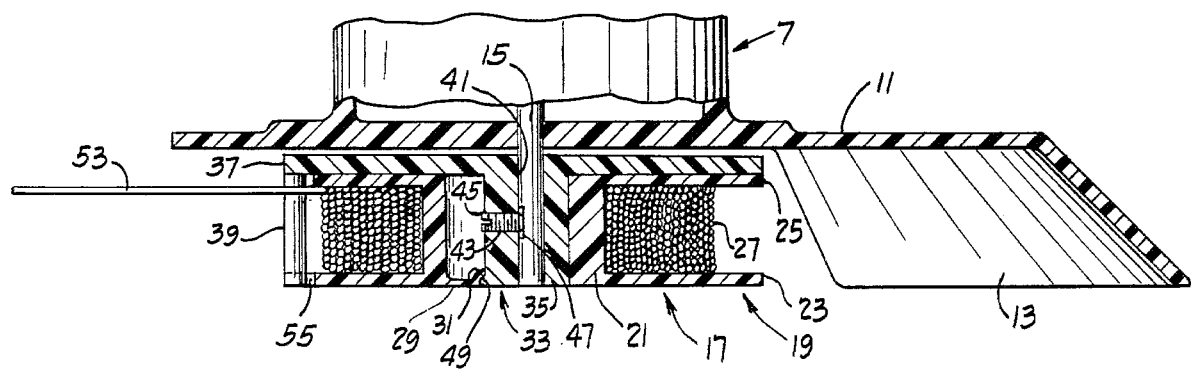
Fig. 3

WEED CUTTING APPARATUS

My invention relates to a monofilament weed cutter and particularly relates to a filament line holder and dispenser which automatically meters out a new length of filament line each time a prior length wears a predetermined amount.

The invention more specifically relates to a selffeeding monofilament weed cutter having a storage and metering device which automatically feeds from a supply coil a length of filament line each time that the prior length wears a predetermined amount, and feeds the same regardless of the direction of rotation of the coil; and which includes a manual override to enable the selective manual feeding of a length of the monofilament line.

A prior art device which automatically feeds filament is shown and described in U.S. Pat. No. 3,895,440 which issued to Charles B. Pittinger, Jr. on July 22, 1975. In this patent a vegetation trimmer is disclosed having a disc-shaped filament holder with a central attachment for a power drive, and a plurality of circumferentially spaced holes through which a filament having one end secured to the disc is threaded. The filament is threaded through the various successive openings in a serial pattern, and each hole is preferably provided with an abrasive or chafing contour so that the resistance of the material causes some oscillation of the filament relative to the hole through which it is threaded to cause failure of the filament at the hole. Upon each such failure, a fresh cutting length which is anchored at the next successive hole back in the stringing or threading series is adapted to project as a cutting length swinging radially from the disc under the centrifugal force of the operation. A disadvantage to the foregoing device resides in the complex and time-consuming manner in which the filament must be threaded on the filament holder before the device can be operated properly.

Other monofilament weed cutters have been disclosed in French Letters Patent No. 1,281,450; West German Petty Patent Nos. 6,919,841; 6,919,842; 6,919,843; 6,919,844; 6,938,265 and 7,043,648, each of which discloses a disc-like head member adapted to be rotated by electric means such as electric motors, and contains a spool which is houssed in the head member in coaxial relationship with the shaft of the motor. The spools have a length of flexible non-metallic line of nylon or other polyethylene coiled thereon. The free traveling end of the line extends generally peripherally from the spool and head, and is flung arcuately about upon actuation of the motor to cut adjacent vegetation in the manner of a flail. Other patents describing weed trimmers of the monofilament type include U.S. Pat. No. 3,708,967 to Geist; and U.S. Pat. Nos. 3,826,068 and 3,859,776 to Ballas and Geist. The devices disclosed in each of these patents have the common drawback that, when the extending line wears and becomes shortened through use, it can only be restored to its proper cutting length by terminating rotation of the body and by unreeling the respective lines mechanically to extend them as desired.

It is an object of my invention to provide an improved automatic feed for a monofilament cutter used in cutting vegetation or the like.

Another object of my invention is to provide an improved filament metering means for a weed cutter, for automatically metering desired lengths of filament for use in cutting and for selectively manually metering the filament.

Another object of my invention is to provide improved means for storing a coil of monofilament line in a filament weed cutter, and for paying out sequential lengths of the line.

Yet another object of my invention is to provide an improved means for controlling the stress concentration in the filament in a filament weed cutter, to control the fracture of the line and the freeing of a new length of line for cutting use.

An additional object of my invention is to provide a device of the type referred to which affords improved consumer safety and ease of operation.

A further object of my invention is to provide an improved device of the type described which is economical in construction, highly efficient in use and relatively inexpensive to manufacture.

Other objects of my invention and the invention itself will become more readily apparent by reference to the annexed figures of drawings, in which:

FIG. 1 is a side view of a filament weed cutter incorporating apparatus according to the invention;

FIG. 2 is a bottom plan view taken in the direction 2—2 as indicated in FIG. 1; and FIG. 3 is a side elevational view, partly in section, taken in the direction 3—3 shown in FIG. 2.

In the drawings in all of which like parts are designated by like reference characters, a monofilament weed cutter 1 is shown which incorporates a handle 3 attached to the uppermost end of an upwardly extending, inclined shaft 5 which in turn supports a motor assembly 7 and a weed cutting apparatus according to the invention. Motor assembly 7 includes a plastic housing 9 whose lowermost portion comprises a plate 11 and a depending arcuate, protective shield 13. Motor assembly 7 further includes a downwardly extending drive shaft 15 which rotates in response to actuation of the motor. The motor (not shown) can be of the electric or internal combustion type.

A monofilament storing and metering device 17, which is the subject of the present invention, is mounted on shaft 15 to be rotatable therewith. Device 17 includes a spool or reel 19 having a hub or winding mandrel 21 extending between a pair of opposed, parallel flanges 23 and 25. Spool 19 is adapted to receive a supply of monofilament line 27 which is wound about hub 21 between flanges 23 and 25 to form a freestanding coil. The outer surface of core or winding mandrel 21 has a generally triangular configuration (FIG. 2), and shapes the coil of monofilament line 27 in a similar configuration. The shape and orientation of the mandrel effects the relationship between the forces discussed below acting on the line when shaft 15 is rotated. Spool 19 further includes an inwardly extending resilient snap or hook 31 whose purpose will be explained below.

Device 17 further comprises a support member 33 including a central core 35 depending from an upper flange 37. A set of equi-angularly disposed, downwardly extending restraining members 39 extend downwardly from flange 37 about core 35 and, as explained below, each have a height substantially equal to the height of spool 19 measured between the outer surfaces of flanges 23 and 25. Core 35 has a central bore 41 dimensioned to slide over drive shaft 15, and a transverse hole 43 for receiving a set screw 45 for releasably securing device 17 to drive shaft 15. A recess 47 is provided in drive shaft 15 for receiving the end of set screw 43 to facilitate the locking function. A lip 49 extends partially around the lower portion of hub 35 for receiving hook 31 of spool 19.

In order to use spool 19, line 27 is wound thereon in a conventional manner, and the inner surface of hub 21 is positioned adjacent corresponding outer surface of hub 35 and spool 19 is slid over hub 35 until hook 31 reaches lip 49. Sufficient axial force is then applied to spool 19 to snap hook 31 over lip 49, and the loaded spool is then in place.

Restraining or retaining members 39 serve several important functions. Members 39 prevent monofilament line 27 in the freestanding coil from falling freely from spool 19. Furthermore, these restraining members engage the inner end of the free end strand 53 of monofilament line 27 during the operation of the device, and by virtue of the bending of the line about respective members 39, establish the breakpoint of the line as discussed below. The contour of the restraining members controls the fatigue forces applied by those members to the line, by defining the bend angle and hence the stress concentration in the engaged part of the line. Restraining members 39 are shown as being of cylindrical configuration (with the radially outward portions 54 being flattened). Restraining members 39 are disposed slightly outwardly of the distal edges of flanges 23 and 25 to define a clearance between members 39 and flange 23. This clearance renders line 27 mutually accessible so that a free end 53 of the line can be manually withdrawn from spool 19. Such manual withdrawal could become desirable when the previously-withdrawn free end 53 has become dull and has not been severed by one of members 39. The number and angular displacement of restraining members 39 also effects the length of free end 53 as explained hereinafter.

After spool 19 has been loaded with monofilament line, and the spool has been mounted on support member 33 to operatively mount spool 17 on drive shaft 15, weed cutter 1 is ready for operation. A strand 53 of the monofilament line is withdrawn from spool 19 such as through opening 55, the weed cutter is oriented in the position shown in FIG. 1, and the motor is actuated. Upon actuation of the motor, shaft 15 rotates (counterclockwise as indicated by arrow A in FIG. 2), and strand 53 whirls about, being forced radially outwardly under the influence of centrifugal force. The force acting on strand 53 is represented force vector F, in FIG. 2. The strand acts as a flail and severs weeds in its path. As strand 53 moves through its cutting path and encounters vegetation, fatigue forces are established where the line engages the particular retaining member 39 from which it radially extends, and when the line reaches its fatigue limit, the line fails and strand 53 is severed. When the strand is severed, centrifugal force urges the line extending between the foregoing retaining member and the next sequential member 39 to swing outwardly about the latter retaining member 39 and to extend radially outward therefrom. It should be noted that the foregoing metering action of the monofilament line occurs in the same manner regardless of the direction of rotation shaft 15.

Line 27 may at times be metered in a second manner even though the fatigue forces at retaining member 39 do not exceed the fatigue limit of the line. The centrifugal forces acting on line 27 effect the force F, on free strand 53 as discussed above, and also effect a force $F_2$ on the next adjacent segment of line as shown in FIG. 2. As strand 53 moves through its cutting path, it may be abraded and shortened as it encounters coarse obstacles such as concrete and rock. Since the magnitude of force $F_1$ is a function of the mass and hence the length of strand 53, the magnitude of force $F_1$ diminishes as it is shortened. In the event that $F_1$ declines in magnitude below that of force $F_2$, force $F_2$ pulls strand 53 out of engagement with the retaining member 39 from which it has been extending, and strand 53 and the next adjacent segment of line 27 swing about the next adjacent member 39 and extend radially from the latter member. A clipper in the form of a sharp blade 56 depends from shield 13 and severs the latter radially extending strand to a desired length when the strand rotates into engagement therewith.

There may be instances when the free end of the monofilament is not automatically metered, such as when strand 53 becomes frayed and dulled, but not significantly shortened. In such event, a new free end should be manually withdrawn from spool 53 as discussed elsewhere, and thereafter the metering will be automatic.

The forces acting on monofilament line loaded in the present device can be controlled by several structural modifications to the device. Thus, the angle through which the line is bent about the respective retaining members can be increased by reducing the contact area of the retaining member and the line, to thereby increase the stresses and reduce the breaking point of the line thereat. Also, the pullout force $F_2$ can be varied by varying the distance between the place at which the strand of line adjacent the free end 53 leaves the coil and engages the retaining member from which free end 53 extends (because force $F_2$ depends on the mass and hence the length of the strand). For instance, if the three-sided mandrel 21 in FIG. 2 were rotated clockwise a few degrees, force $F_2$ would be reduced. Such control of force $F_2$ can be effected also by using other sizes and shapes of mandrels 21.

The weed cutter, according to the present invention, can be seen to accomplish the objects set forth above. Monofilament line can easily be loaded onto the spool and is automatically metered during the operation of the weed cutter in a very effective manner. Although a particular number of retaining members has been described herein, in various circumstances, it might be advantageous to use a different number of these members. For example, variations in the nature of the line and the size of the weed cutter might make other numbers of members 39 desirable. In the event the operator desires to withdraw the free end of the monofilament line, means are provided for manually doing so. The device can be manufactured and used efficiently and effectively. Since the cutting implement is monofilament line, the apparatus is safe to the user.

The invention has been described in detail with particular reference to the preferred embodiment thereof, but variations and modifications within the spirit and scope of the invention may occur to those skilled in the art to which the invention pertains.

I claim:

1. A device for storing and automatically metering monofilament line on a filament weed cutter, said device comprising:
a spool including a pair of opposing, parallel flanges, a hollow central hub extending between said flanges, and a resilient snap member on said hub, said spool receiving a freestanding coil of monofilament line on said hub between said flanges;

a support member comprising a flange, a central core extending from said flange, said core having a central bore for receiving a motor drive shaft and an outer surface configured to extend through the hollow hub of said spool for attaching said spool to said core and a lip extending radially from said outer surface for releasably engaging said snap member to releasably lock said spool on said support member, locking means for attaching said support member to the drive shaft for rotation with the drive shaft, and a plurality of retaining members extending transversely from said flange and spaced equi-angularly about said core in the direction of said central core and disposed radially outwardly of said spool for retaining the coil of monofilament line on said spool;

said support member and said spool rotating in response to the rotation of the motor shaft to cause a free end strand of the monofilament line to engage one of said retaining members and extend radially outwardly therefrom a predetermined distance to define a cutting path, said retaining members sequentially engaging each of successive strand portions to automatically meter sequential free end strands of the line.

* * * * *